April 21, 1959   P. J. RIEPPEL ET AL   2,882,588
SIMULTANEOUS PRESSURE WELDING AND PRESSURE FORMING
Filed March 10, 1954   3 Sheets-Sheet 3
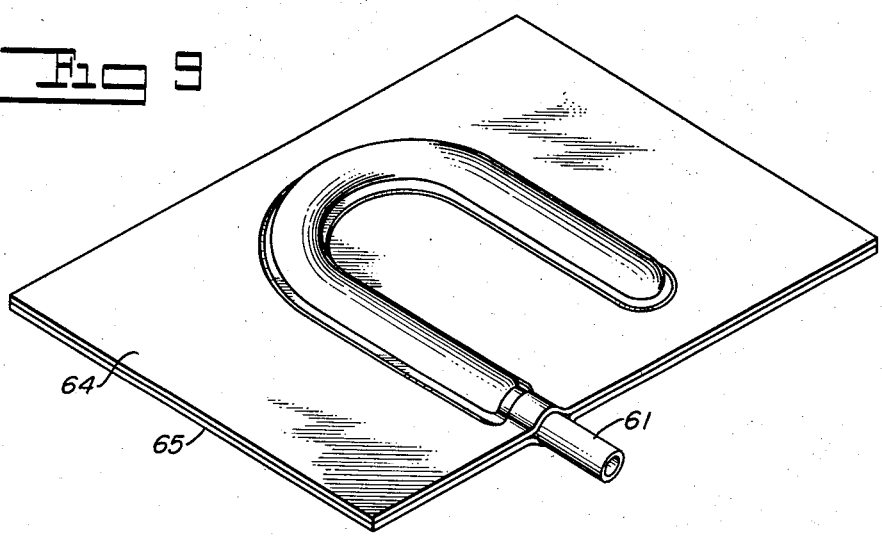
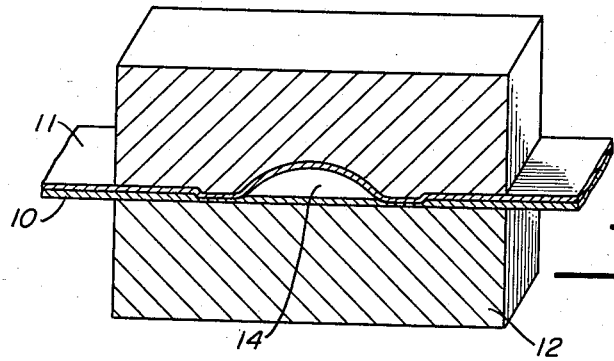
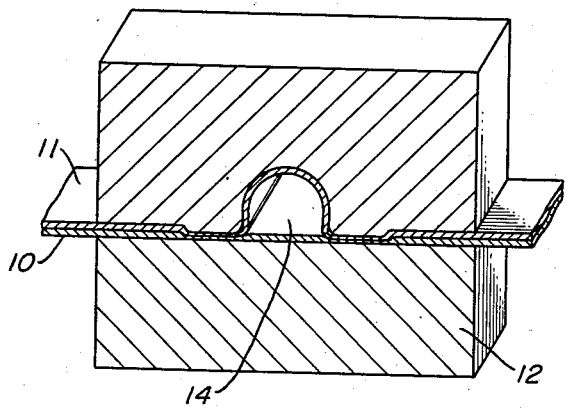
INVENTORS.
Perry J. Rieppel
Melvin C. Clapp
Edwin G. Elliott, Jr.
BY
ATTORNEYS.

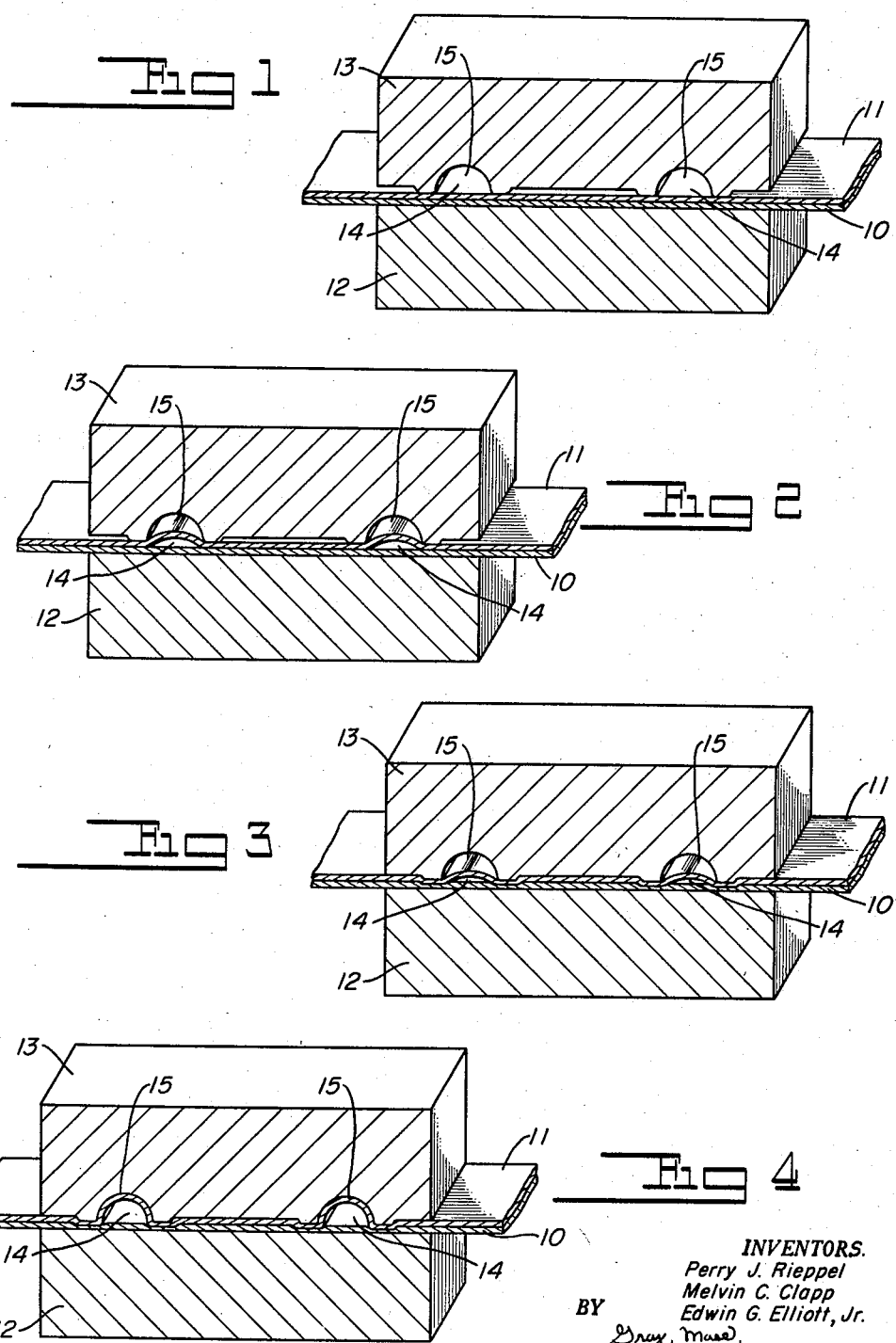

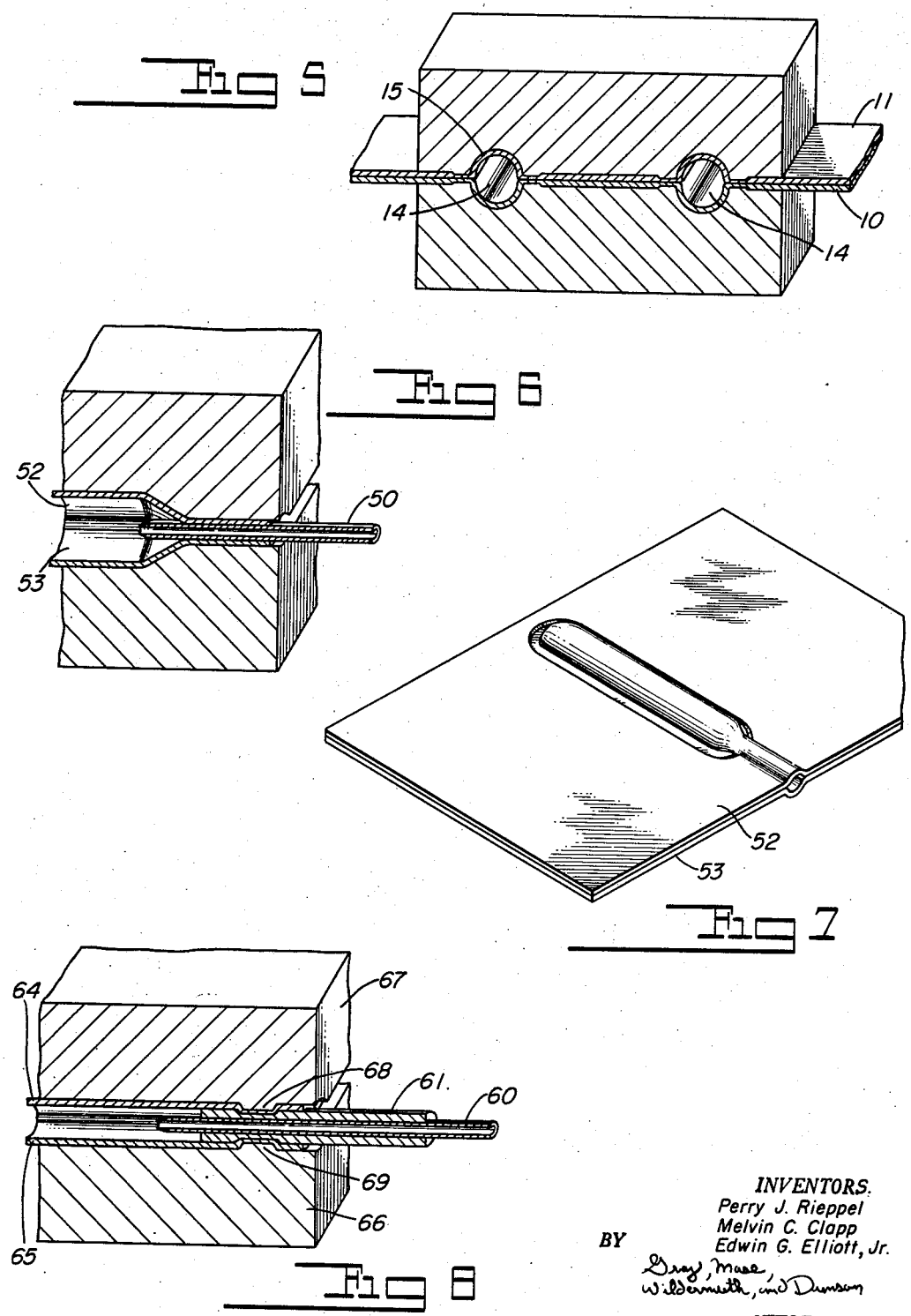

United States Patent Office 2,882,588
Patented Apr. 21, 1959

2,882,588

SIMULTANEOUS PRESSURE WELDING AND PRESSURE FORMING

Perry J. Rieppel, Worthington, and Melvin C. Clapp and Edwin G. Elliott, Jr., Columbus, Ohio, assignors, by mesne assignments to The Metal Specialty Company, Cincinnati, Ohio, a corporation of Ohio Application March 10, 1954, Serial No. 415,272

12 Claims. (Cl. 29—157.3)

This invention relates to pressure welding, and, more particularly, to an improved method for simultaneous pressure forming and pressure welding of pressure weldable material such as aluminum or similar materials.

Pressure welding consists primarily in inserting materials to be welded together between a pair of dies and then closing the dies until a predetermined deformation has occurred in the metal being welded. This method of welding has particular application in the welding together of sheet materials, although other articles may also be welded by this process. The welding may be done either with, or without, the application of heat to the material being welded. In the past it has been found that, when no heat is introduced into the process, it is necessary to deform aluminum about 65 to 75 percent in order to obtain a good weld, while raising the temperature of the aluminum prior to closing the dies necessitates a deformation of only about 50 to 65 percent for a suitably welded joint. The pressure applied to the dies is necessarily much greater in the case where no heat is applied to the material to be welded.

When metal sheets being pressure welded together are heated to the range of temperature wherein they attain a greater ductility it is possible by the injection of a forming medium such as a gas or a fluid under pressure between the metal sheets to readily force the metal of the sheets to assume the shape of the dies. However, in some instances it is not necessary to heat the sheets. Thus, it is possible to form continuous tubing, chambers, or other shapes between the metal sheets simultaneously with the pressure welding of the sheets together.

These processes of pressure welding and pressure forming have been combined in the past for the production of various articles. ("Pressure Welding," by Hermann, Metal Industry, February 22, 1946, pp. 143 through 147.) Certain difficulties have been encountered in the combined process, however, especially in the forming of chambers or tubing in which the ratio of depth to width is greater than about 1:2. When the ratio is less than 1:2, there is generally sufficient metal in the chambers in the metal sheets to provide for the stretching of the metal into the desired shape. When this ratio is about 1:2 or greater, however, this is not the case, and it is necessary to provide additional metal to the chamber in order that the formed metal will not tear.

Considerable difficulty has also been present in the part in the arrangement of the dies. This problem is especially severe when a complicated pattern is being welded. It is necessary that the opposing welding teeth of the dies be very accurately aligned, since the strength of the weld joint is reduced substantially when the teeth are even a short distance out of exact alignment.

Another problem encountered in the combined process of pressure welding and pressure forming is the method of introducing gas pressure between the metallic sheets. In the past, several methods have been used. In one method, a tube is first welded, brazed, or mechanically affixed onto one sheet and this tube is then passed through a hole in the die and connected to a gas line. This method requires additional time for the welding of the tube and also slows down the process by requiring the aligning of the tube in the hole in the die. In another method, a washer is used to separate the metallic sheets and a mandrel is forced through holes in the sheets into the hole in the washer. The washer has radial holes communicating with the space between the sheets. This method also requires considerable aligning prior to the welding operation and thus an increased time is required for the production of each welded article.

It has been found that the necessary extra metal for the forming of chambers with a large depth to width ratio in a pressure-formed article may be provided from the metal extruded from the weld area. Thus, according to the process of this invention, the sheets are first heated to a more ductile condition and then placed between the dies and the dies are closed tightly enough to hold the sheets in place but not to deform the metal. The dies may be heated to the desired temperature and in this case preheating of the metallic sheets is not necessary. Next, a low gas pressure or other fluid pressure is introduced between the sheets to partially form the article. Then the dies are closed sufficiently to weld the pieces together. The welding extrudes metal from between the die teeth, and this metal is used in the final forming operation when a high gas pressure or other fluid pressure is introduced between the metal sheets and the chamber is completely formed by this high gas pressure.

It has also been found that it is not necessary to provide opposing die teeth for a satisfactory weld. A good weld can be made by providing welding teeth in only one die surface, the other die having a flat surface. This considerably reduces the cost of the dies and eliminates the strict requirement of close alignment of opposing die teeth. Another advantage of this process is found when the shapes to be formed are machined into only one of the dies.

It has also been found that the time for the operation of this process is reduced when the gas pressure for forming is introduced through a hollow needle or mandrel placed between the sheets and extending from between the sheets in a plane parallel to the plane of the sheets. In one modification, a hollow steel needle is placed between the sheet in order to provide the necessary gas pressure. After the article is formed, the needle is withdrawn and the resulting hole may be closed by any suitable method. In another modification, a hollow aluminum tube is provided with a hollow steel mandrel in the hole of the tubing. It is not necessary that the mandrel be close-fitting. A gas line is connected to one end of the mandrel and the assembly is then placed between the sheets to be welded together. In the welding operation, the aluminum tube is pressure welded to the sheet and, after the welding and forming operations, the steel mandrel is withdrawn. This modification provides a hollow tube extending from the sheet and communicating directly with the chamber or continuous tubing formed in the sheets. This extending tube is useful in many applications of the finished product.

It is, therefore, an object of this invention to provide an improved method for the simultaneous pressure forming and pressure welding of aluminum and similar materials.

It is also an object of the present invention to provide a method for the simultaneous pressure welding and pressure forming of aluminum and similar materials wherein metal extruded from the area of the weld is used to aid in the forming of chambers in which the depth to width ratio is large.

Another object is to eliminate the necessity for accurate alignment of the dies in the simultaneous pressure welding and pressure forming of aluminum and similar materials.

Still another object of this invention is to reduce the time necessary for the simultaneous pressure welding and pressure forming of aluminum and similar materials by providing an improved method for the introduction of gas or other fluid pressure between the materials being welded.

A further object is to provide a method for increasing the strength of articles formed in a pressure-welding, pressure-forming process.

Other objects and advantages of this invention will become apparent from the disclosure herein.

In the drawings:

Fig. 1 is a cross-sectional view of a sheet material inserted in dies prior to the application of either gas pressure or die pressure in accordance with the present invention;

Fig. 2 is a cross-sectional view of a sheet material inserted in the dies after an initial low gas pressure has been applied;

Fig. 3 is a cross-sectional view of a sheet material inserted in the dies after the dies have been closed and full welding pressure applied;

Fig. 4 is a cross-sectional view of a sheet material inserted in the dies after the forming pressure has been applied;

Fig. 5 is a cross-sectional view of a sheet material inserted in dies after the final forming pressure is applied in which the recesses cut into the dies have a circular cross section;

Fig. 6 is a partial cross-sectional view of the welding dies, illustrating one method of introducing gas or fluid pressure between the sheets;

Fig. 7 is a perspective view of an article produced by the dies illustrated in Fig. 6, before the gas-introducing mandrel has been removed;

Fig. 8 is a cross-sectional view of the welding dies illustrating another method of introducing gas or fluid pressure between the sheets;

Fig. 9 is a perspective view of a finished article produced by the dies illustrated in Fig. 8;

Fig. 10 is a cross-sectional view of a pressure welding die wherein no extra metal is required in the forming of a convolution; and, Fig. 11 is a cross-sectional view of a pressure welding die providing substantial amount of extra metal for forming a convolution.

Prior to operation of this process, the materials to be welded should be thoroughly cleaned. The surfaces must be degreased in order to remove any impurities. A commercial degreaser may be used. The surfaces are thoroughly rinsed and then are dried in clean hot air or by simply allowing the sheets to dry. The surfaces of the metal may also be deoxidized by a commercial deoxidizing agent. Next the surfaces should be brushed with a wire brush. This removes any surface impurities that were not previously removed by the degreasing and deoxidizing agents. Although suitable welds have been made without the wire brushing, it is not desirable to eliminate this step since any impurities on the surface will produce faults in a weld.

After the metal has been cleaned, it is heated to a temperature wherein it attains a more ductile condition. For aluminum, it has been found that temperatures from about 750° F. to about 950° F. are satisfactory. At temperatures lower than about 750° F., much greater pressures will be necessary to attain a good weld and the sheets will not be readily formed by gas or fluid pressure. At temperatures over 950° F., the metals tend to stick to the dies. This heating of the metals may be accomplished before the metal is placed in the dies, or it may be accomplished while the metal is in the dies prior to the welding. The dies should be maintained at a temperature sufficiently high to keep the metal at the desired temperature. If the heating of the metal is done by the dies, the metal should be held in the dies for a short time prior to welding. The dies may be heated electrically, by hot salts, by gas, or by any other convenient method that maintains the necessary temperature.

After the metal has been inserted between the dies, the dies are closed sufficiently to contact the metal but not far enough to deform the metal. This is illustrated in Fig. 1, where the metal sheets 10 and 11 are placed on a lower die 12 and an upper die 13 is brought into contact with the upper sheet 11. When the dies are thus closed and the metal is heated to the desired temperature, gas pressure is introduced between the sheets in the area 14 of the sheets adjacecnt recesses 15 cut in the dies. According to this invention, this gas pressure is not sufficient to completely form the chamber (see Fig. 2). The required gas pressure for this step may vary with different materials. This initial forming is necessary to prevent the buckling that occurs in the chamber if all of the gas pressure is introduced subsequent to the welding. Thus in general it may be stated that the pressure should be at least sufficient to prevent buckling of the chamber on welding, but not great enough to substantially weaken or tear the metal sheets. For aluminum, it has been found that pressures from about 50 p.s.i. to about 300 p.s.i. are sufficient to accomplish this purpose. The thickness of the metal being welded will not materially affect the amount of pressure necessary for this initial forming, since, when the metal is heated to 750° F. or higher, the tensile strength of the metal is so low that variations in thickness are not important. After the initial forming pressure has been applied, the dies are closed sufficiently to deform the metal and to make the weld (see Fig. 3). Deformations of from about 50 to about 70 percent are necessary for good welds by this process depending on the material being welded. For example, it has been found that deformations of 50 to 55 percent are best for 3S aluminum, deformations of 55 to 60 percent are best for 24S aluminum, and deformations of 60 to 65 percent are best for 61S aluminum. After the deformation has taken place, the final gas pressure is applied (see Fig. 4). It has been found that for aluminum, pressures up to about 700 p.s.i. are required for complete forming of the article. The only limitation on the gas pressure for forming sheet 0.040 inch thick or greater appears to be that the pressure not be great enough to force the dies open. When the article has been completely formed, the gas pressure is released. The dies are then opened, and the finished article is removed from the dies.

When there is sufficient metal in the region of the chamber itself to expand properly into the die, all of the pressure forming may be done prior to the final pressure welding. This is not true, however, when there is not sufficient metal in the area being pressure formed to supply the additional metal needed for the forming. In this case, if all of the pressure forming is done prior to the pressure welding, considerably more gas pressure is necessary in the forming and the article tends to tear. The finished article also tends to have weak spots. According to the principle of this invention, however, if the final pressure forming is accomplished after the pressure welding, metal extruded from between the welding ridges will be forced into the area of the chamber being formed, and this additional metal will be sufficient to properly form the chamber and eliminate weak spots. In other words, expanding of the metal into the recesses in the die causes more stretching of the metal at the zone where the metal bends over the sharpest corners, (i.e. the edges of the recess adjacent the welding teeth), and thus the metal tends to be thinner at this zone. Forcing of metal from between the welding teeth into this zone prior to final pressure welding provides ample extra metal to allow more nearly uniform thickness of metal. In this regard, the width of the welding teeth is of some importance. The teeth must be sufficiently wide to provide for extruding metal from each side of the tooth into the chamber to supply the additional metal needed. In one example, it was found that welding teeth 0.120 inch wide were sufficiently wide to provide for the forming of 40 mil aluminum into a semicircle of 3/16 inch radius. It has also been found that if all of the pressure forming is done after the pressure welding, the material will tend to tear as well as to buckle.

While the process of this invention has been previously described as a step by step method, it is also possible according to the principles of this invention to combine the steps. Thus, after the initial forming pressure has been applied, it is possible to gradually increase the die pressure up to the desired amount. It is also possible to gradually increase the gas pressure up to the desired amount, provided that the final forming pressure is applied only after the pressure welding has been accomplished.

Although the optimum gas pressure applied between the sheets is not dependent on the thickness of the sheets, the optimum pressure applied to the dies does vary with sheet thickness. Thus when 3S aluminum is being welded the metal being welded should be deformed from about 50 to about 55 percent at about 825° F., and the pressure applied to the dies to attain this deformation will necessarily be dependent on the thickness of the sheets. It is preferred that a forming gas be used that will not form compounds with the metals, such as the inert gases or nitrogen, but in some instances air may be used. The only disadvantage in using air is that some impurities may form on the surfaces of the metal being welded and an imperfect joint may result. When small chambers are being formed, it is not necessary to heat the forming gas. When larger convolutions are to be formed, however, it may be preferred to heat the gas, to avoid chilling the dies and sheet.

Unless the dies or the metal sheets being welded are treated prior to welding with a material to prevent sticking, the sheets will stick to the dies after they have been welded and formed. Various graphite compounds, such as those known as Oildag or Aquadag may be used for this process. Also, various chalk or talc compounds may be used. The compound may be applied either to the dies or to the surfaces of the metal sheets coming in contact with the dies. In a commercial process it is preferable to apply the anti-sticking compound to the metal sheets since it reduces the time the dies are in use with each article. A single application of anti-sticking compound may last for several welding operations. The compound may be applied either as a solution or as a powder. In any case, however, extreme caution must be taken not to contaminate the surfaces to be welded.

The practice of this invention has been found to be useful for welding and forming of aluminum and aluminum-base alloys and copper-base alloys. Similarly, silver, gold, and platinum may be welded by this process. Various other similar metals and alloys may be welded and formed by this process, although metals such as iron or steel are not readily usable in the process.

Although a number of different methods may be used for introducing the forming gas pressure between the metal sheets, it has been found that the fastest method is to introduce the gas through a hollow tube inserted between the sheets. This method eliminates the necessity for prewelding a tube to the sheets, and obviates the aligning of holes drilled in the sheets as required if a hollow mandrel is to be inserted through the sheets in a plane normal to the surface of the sheets. In one variation of the preferred method, shown in Figs. 6 and 7, a hollow steel needle 50 is connected to a source of gas pressure (not shown), and the open end of the needle is inserted between the metal sheets 52 and 53 prior to initial closing of the dies. The needle thus extends from the edges of the sheets and communicates with the spaces between the sheets to be formed. If the areas to be formed are not continuous, a separate needle is needed for each separate area. After the pressure welding and pressure forming have been completed, the needle is withdrawn from between the sheets and the resulting hole may be closed by any convenient means. If it is desired that the completed article have an outlet communicating with the internal chambers between the sheets, a modification of this method may be used advantageously. In this modification (illustrated in Figs. 6 and 7), a hollow steel mandrel 60 is provided with an aluminum sleeve 61. One end of the mandrel is connected to the gas pressure supply by suitable means and the other end of the assembly is inserted between the metal sheets 64 and 65. In this case, the dies 66 and 67 are shaped to accept this assembly and welding teeth 68 and 69 are provided to pressure weld the sheets to the aluminum sleeve at the time the sheets are welded together. After the welding and forming are completed, the mandrel 60 is withdrawn, leaving the aluminum sleeve or tube extending from between the sheets and pressure welded to the sheets. The mandrel may be coated with an anti-sticking compound to permit easy removal.

The shape of typical die teeth for combined pressure welding and pressure forming is illustrated in Figs. 10 and 11. In forming the chamber, the weakest spot is generally in the area where the metal joins the weld. When the expansion of the metal is not great, extrusion of metal from the corners of slightly rounded die teeth will be sufficient to overcome this weakness. In general, it may be stated that when the overall expansion does not exceed about 35 percent, no additional metal is needed to adequately form the chamber (see Fig. 10). When metal thicknesses of from 0.025 inch to 0.060 inch are used, it has been found that rounding the edges of the recesses in the dies to have a radius of about 1/16 inch permits adequate extrusion. Any increase in this radius is not desirable, since it increases the distance between adjacent welds, and thus decreases the strength of the finished article. It is not necessary to round edges in the dies where no forming is to take place. In some cases it is desirable to provide a groove in the die at the edges of the die teeth where no forming is to take place in order to provide room for the metal extruded from between the edges of the teeth.

When it is desired to form a chamber in which the ratio of depth to width is greater than about 1:2, however, it is necessary to take special precautions in the forming of the edges of the recesses in the dies. It has been found that increasing the radius of the rounded corners of the die teeth has the effect of extruding more useable metal into the chamber as well as providing a smooth surface around which the metal may form. When the edges are not rounded sufficiently, extruded additional metal provided by widening the welding teeth is forced away from the sides of the recesses and towards the center of the chamber, thus creating folds or defects in the metal. In forming a circle with sheet thicknesses from 0.025 to 0.060 inch, and in which the ratio of depth of the chamber in either die to the radius of the circle is greater than about 1:1, the radius of rounding of the edges of the die recesses must be at least 1/8 inch. It has been found that this additional rounding is necessary in order to prevent decreased bursting strength at the edges of the chamber.

From the foregoing description, it is apparent that the method and apparatus of this invention provide many improvements in the combined pressure welding and pressure forming of articles. The tendency of the sheets to buckle and tear is greatly reduced by partially forming the article prior to welding, and finishing the forming after the welding is completed. In this method, metal extruded from the weld is utilized to strengthen the chambers formed. Necessity for extreme accuracy of alignment of the welding dies is eliminated by the use of one flat die without teeth. The use of a flat die also has the advantage of increasing the strength of the finished articles. The invention also provides for the introduction of gas or fluid pressure through a tube inserted between the sheets prior to closing the dies.

It will be understood, of course, that while the forms of the invention herein shown and described constitute the preferred embodiment of the invention, it is not intended herein to illustrate all of the possible equivalent forms or ramifications of the invention. It will also be understood that the words used are words of description, rather than of limitation and that various changes, such as changes in shape, relative size and arrangement of parts, may be substituted without departing from the spirit or scope of the invention herein disclosed.

What is claimed is:

1. A method for welding and forming sheets of pressure-weldable material comprising inserting said sheets in tight face-to-face relationship between pressure-welding-and-forming dies, introducing between said sheets a forming medium having a pressure sufficient to partially form said sheets, then applying welding pressure to said dies, and then increasing the pressure of said forming medium to completely form said sheets.

2. A method for welding and forming sheets of pressure-weldable material comprising inserting said sheets in tight face-to-face relationship between pressure-welding-and-forming dies, then introducing a gas under pressure between said sheets to form said sheets partially to the shape of recesses cut in said dies, then applying welding pressure to said dies, and then increasing the pressure of said gas to completely form said sheets to the shape of said recesses.

3. A method for welding and forming sheets of pressure-weldable material comprising heating said sheets to a plastic condition and inserting said sheets in tight face-to-face relationship between pressure-welding-and-forming dies by closing said dies to contact said sheets without substantially deforming said sheets, then introducing a gas under pressure between said sheets to form said sheets partially to the shape of convolutions cut in said dies, then applying welding pressure to said dies, and then increasing the pressure of said gas to completely form said sheets.

4. A method for welding and forming sheets of pressure-weldable material comprising inserting said sheets in tight face-to-face relationship between pressure-welding-and-forming dies, inserting a hollow tube between said sheets, said tube extending from between said sheets and communicating with the areas of said sheets adjacent to recesses cut in said dies, then introducing a gas under pressure between said sheets through said tube to form said sheets partially to the shape of said recesses, then applying welding pressure to said dies, and then increasing the pressure of said gas to completely form said sheets.

5. A method for welding and forming sheets of pressure-weldable material comprising inserting said sheets in tight face-to-face relationship between pressure-welding-and-forming dies, inserting a hollow needle between said sheets in a plane parallel to the plane of said sheets, said needle being placed in such a position that it extends from between said sheets and communicates with the areas of said sheets adjacent to recesses cut in said dies, then introducing a gas under pressure through said needle to the area between said sheets to form said sheets partially to the shape of said recesses, then applying welding pressure to said dies, then increasing the pressure of said gas to completely form said sheets, then releasing said gas pressure and removing said needle from between said sheets.

6. A method for welding and forming sheets of pressure-weldable material comprising inserting said sheets in tight face-to-face relationship between pressure-welding-and-forming dies, inserting between the sheets a hollow mandrel having a pressure-weldable sleeve, said mandrel and said sleeve being placed in such a position that a portion of each of them extends from between the sheets and said mandrel extends to an area between the sheets adjacent to recesses cut in said dies, then introducing a gas under pressure between said sheets through said mandrel to form said sheets partially to the shape of said recesses, then applying welding pressure to said dies to weld said sheets together and to weld said sleeve to said sheets, then increasing the pressure of said gas to completely form said sheets, then releasing said gas and removing said mandrel from said sleeve, thereby leaving said sleeve welded between said sheets.

7. In a pressure-welding, pressure-forming process, the method for providing forming gas between two sheets of pressure-weldable material comprising placing said sheets between pressure-welding-and-forming dies, inserting a hollow needle between said sheets so that one end of said needle extends from between said sheets and the other end thereof communicates with an area of said sheets adjacent to recesses cut in said dies, introducing forming gas under pressure between said sheets through said needle, removing forming gas from between said sheets, and removing said needle from between said sheets.

8. In a process for pressure welding and pressure forming, the method for providing forming gas between two sheets of pressure-weldable material comprising placing said sheets between pressure-welding-and-forming dies, providing a hollow mandrel with a sleeve of pressure-weldable material, inserting said mandrel and sleeve between said sheets so that one end of said mandrel and sleeve extends from between said sheets and so that the other end of said mandrel and said sleeve communicates with an area between said sheets adjacent to recesses cut in said dies, introducing forming gas between said sheets through said mandrel, pressure welding said sheets together and to said sleeve, removing said forming gas from between said sheets through said mandrel, and removing said mandrel from said sleeve, thereby leaving said sleeve pressure welded between said sheets.

9. A method of welding and forming sheets of pressure-weldable material comprising placing said sheets in face-to-face relationship between a flat die and a pressure-welding-and-forming die by closing said dies to hold said sheets, then introducing a gas under pressure between said sheets to form one of said sheets partially to the shape of recesses cut in said die, then applying welding pressure to said dies, and then increasing the pressure of said gas to completely form said sheets to the shape of said recesses.

10. A method for welding and forming sheets of aluminum and aluminum-base alloys comprising heating said sheets and inserting them in tight face-to-face relationship between pressure-welding-and-forming dies, then introducing a gas under pressure between said sheets to form said sheets partially to the shape of recesses cut in said dies, then closing said dies to cause pressure-welding teeth on at least one of said dies to deform said sheets from about 50 to about 70%, then increasing the pressure of said gas to completely form said sheets to the shape of said recesses.

11. A method for welding and forming sheets of aluminum comprising heating said sheets to a temperature of from 750° F. to 950° F. and inserting them in tight face-to-face relationship between pressure-welding-and-forming dies, then introducing a gas under pressure between said sheets to form said sheets partially to the shape of recesses cut in said dies, then closing said dies to cause pressure-welding teeth on at least one of said dies to deform said sheets to from about 50 to about 70%, then increasing the pressure of said gas to completely form said sheets to the shape of said recesses.

12. A method for welding and forming of sheets of aluminum comprising heating said sheets to a plastic condition and inserting them in tight face-to-face relationship between pressure-welding-and-forming dies, then introducing a gas having a pressure of from 50 to 300 p.s.i. between said sheets, then applying welding pressure to said dies, then increasing said gas pressure to from 300 to 700 p.s.i.

References Cited in the file of this patent

UNITED STATES PATENTS

| | | |
|---|---|---|
| 653,902 | Bray | July 17, 1900 |
| 706,518 | Boyd | Aug. 12, 1902 |
| 2,212,481 | Sendzimir | Aug. 20, 1940 |
| 2,244,475 | Raskin | June 3, 1941 |
| 2,297,219 | Hintze | Sept. 29, 1942 |
| 2,306,526 | Dalzell | Dec. 29, 1942 |
| 2,416,015 | McGuffey | Feb. 18, 1947 |
| 2,514,469 | Burkhardt | July 11, 1950 |
| 2,582,358 | Schoellerman | Jan. 15, 1952 |
| 2,662,273 | Long | Dec. 15, 1953 |
| 2,740,118 | Simmons | Apr. 3, 1956 |

FOREIGN PATENTS

| | | |
|---|---|---|
| 695,640 | Great Britain | Aug. 12, 1953 |